(12) United States Patent
Aboul-Magd et al.

(10) Patent No.: US 10,362,494 B2
(45) Date of Patent: *Jul. 23, 2019

(54) COORDINATED BEAMFORMING FOR OVERLAPPING BSS (OBSS) IN WIRELESS LAN (WLAN)—EXCHANGE OF IDENTITY INFORMATION

(71) Applicant: Huawei Technologies Co., Ltd., Shenzhen (CN)

(72) Inventors: Osama Aboul-Magd, Kanata (CA); Kwok Shum Au, Shenzhen (CN); Jung Hoon Suh, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,331

(22) Filed: Mar. 13, 2017

(65) Prior Publication Data

US 2017/0188244 A1 Jun. 29, 2017

Related U.S. Application Data

(63) Continuation of application No. 14/340,098, filed on Jul. 24, 2014, now Pat. No. 9,628,999.

(51) Int. Cl.
*H04W 16/28* (2009.01)
*H04B 7/024* (2017.01)
(Continued)

(52) U.S. Cl.
CPC ............ *H04W 16/28* (2013.01); *H04B 7/024* (2013.01); *H04W 74/006* (2013.01); *H04W 8/26* (2013.01);
(Continued)

(58) Field of Classification Search
CPC ... H04W 16/28; H04W 84/12; H04W 74/006; H04W 88/08; H04W 92/20; H04W 8/26; H04W 72/046; H04B 7/024
(Continued)

(56) References Cited

U.S. PATENT DOCUMENTS 8,589,687 B2 * 11/2013 Carter ................. H04L 63/0428
455/410
8,711,968 B2 * 4/2014 Seok ..................... H04W 48/20
375/267
(Continued)

FOREIGN PATENT DOCUMENTS

CN 102656941 A 9/2012
CN 102857277 A 1/2013
(Continued)

OTHER PUBLICATIONS

Yusuke, Asai "Update of Interference Management Using Beamforming Technique in OBSS Environment; 11-10-1121-00-00acupdate-of-interference-management-using-beamforming-technique-inobss-environment," IEEE-SA Mentor, Piscataway, NJ USA, vol. 802.11 ac, Sep. 14, 2010 (Sep. 14, 2010), pp. 1-24, XP017676143, [retrieved on Sep. 14, 2010].
(Continued)

*Primary Examiner* — Faisal Choudhury
(74) *Attorney, Agent, or Firm* — Slater Matsil, LLP

(57) ABSTRACT

A method and a device for a coordinated beamforming for overlapping BSS (OBSS) in WLAN are shown. In an embodiment the method includes transmitting, by a first access point (AP) of the plurality of APs, to other APs of the plurality of APs a first coordinated beamforming (CB) announcement message, wherein the first CB announcement message includes an identifier (ID) of the first AP, an ID of each station (STA) associated with the first AP, and a beamforming capability information of the first AP and
(Continued)

receiving, by the first AP, a second CB announcement message from a second AP of the plurality of APs.

20 Claims, 3 Drawing Sheets

(51) Int. Cl.
| | |
|---|---|
| *H04W 74/00* | (2009.01) |
| *H04W 4/00* | (2018.01) |
| *H04W 84/12* | (2009.01) |
| *H04W 88/08* | (2009.01) |
| *H04W 92/20* | (2009.01) |
| *H04W 8/26* | (2009.01) |
| *H04W 72/04* | (2009.01) |

(52) U.S. Cl.
CPC .......... *H04W 72/046* (2013.01); *H04W 84/12* (2013.01); *H04W 88/08* (2013.01); *H04W 92/20* (2013.01)

(58) Field of Classification Search
USPC .......................................................... 370/329
See application file for complete search history.

(56) References Cited

U.S. PATENT DOCUMENTS

| | | | |
|---|---|---|---|
| 9,503,911 B2 | 11/2016 | Aboul-Magd et al. | |
| 2008/0192715 A1 | 8/2008 | Sekhar | |
| 2008/0225770 A1 | 9/2008 | Cho et al. | |
| 2011/0051647 A1 | 3/2011 | Sampath et al. | |
| 2011/0255455 A1* | 10/2011 | Seok ...................... | H04W 36/06 370/311 |
| 2012/0015680 A1 | 1/2012 | Yang et al. | |
| 2012/0122507 A1 | 5/2012 | Gao et al. | |
| 2012/0163264 A1 | 6/2012 | Chu et al. | |
| 2012/0163332 A1 | 6/2012 | Venturino et al. | |
| 2012/0176921 A1 | 7/2012 | Abraham et al. | |
| 2012/0189077 A1 | 7/2012 | Seo et al. | |
| 2012/0257568 A1 | 10/2012 | Cai et al. | |
| 2012/0257574 A1 | 10/2012 | Seok et al. | |
| 2013/0058307 A1 | 3/2013 | Kim et al. | |
| 2013/0157712 A1* | 6/2013 | Park ...................... | H04B 7/024 455/525 |
| 2013/0201835 A1 | 8/2013 | Banerjea et al. | |
| 2013/0242940 A1 | 9/2013 | Jones et al. | |
| 2013/0279381 A1 | 10/2013 | Sampath et al. | |
| 2013/0286959 A1 | 10/2013 | Lou et al. | |
| 2013/0316705 A1 | 11/2013 | Kneckt et al. | |
| 2014/0056204 A1 | 2/2014 | Suh et al. | |
| 2014/0064261 A1 | 3/2014 | Wang et al. | |
| 2014/0080420 A1 | 3/2014 | Yang et al. | |
| 2014/0126408 A1 | 5/2014 | Ding et al. | |
| 2014/0241240 A1* | 8/2014 | Kloper .................. | H04W 16/28 370/328 |
| 2014/0355548 A1* | 12/2014 | Xia ....................... | H04L 5/0051 370/329 |
| 2014/0355564 A1* | 12/2014 | Cherian ............ | H04W 36/0038 370/331 |
| 2015/0016435 A1* | 1/2015 | Hedayat .............. | H04W 76/025 370/338 |
| 2015/0023280 A1 | 1/2015 | Kim et al. | |
| 2015/0078299 A1 | 3/2015 | Barriac et al. | |
| 2015/0288427 A1* | 10/2015 | Wang ................ | H04W 72/1273 370/329 |
| 2015/0288428 A1 | 10/2015 | Choi et al. | |
| 2015/0305069 A1* | 10/2015 | Ryu ...................... | H04W 48/16 370/336 |
| 2015/0373618 A1* | 12/2015 | Deenoo ................ | H04W 8/005 455/502 |
| 2016/0014773 A1 | 1/2016 | Seok | |
| 2016/0066198 A1 | 3/2016 | Wang et al. | |
| 2016/0249366 A1 | 8/2016 | Seok | |
| 2017/0019927 A1* | 1/2017 | Kim ..................... | H04L 5/0055 |
| 2017/0171878 A1 | 6/2017 | Chun et al. | |

FOREIGN PATENT DOCUMENTS

| | | |
|---|---|---|
| CN | 103155467 A | 6/2013 |
| EP | 2739106 A2 | 6/2014 |
| JP | 2012044247 A | 3/2012 |
| JP | 2015536614 A | 12/2015 |
| WO | 2011074761 A1 | 6/2011 |
| WO | 2014029368 A1 | 2/2014 |
| WO | 2014066785 A1 | 5/2014 |
| WO | 2014074919 A1 | 5/2014 |

OTHER PUBLICATIONS

IEEE Std. 802.11ac-2013 "Part 11: Wireless LAN Medium Access Control (MAC) and Physical Layer (PHY) Specifications Amendment 4: Enhancements for Very High Throughput for Operation in Bands below 6 GHz" IEEE Standard for Information Technology—Telecommunications and information exchange between systems Local and metropolitan area networks—Specific requirements, 2013, pp. 1-425.

International Search Report received in Application No. PCT/CN2015/084368, dated Oct. 19, 2015, 11 pages.

V1UKFIERJEE, et al., "Coordinated Beamforming for Mutually Interfering Multi-Antenna Wlan Networks with Vlultipacket Reception," IEEE, May 2013, 4 pp.

VIURAKAMI, et al., "Performance Evaluation of Interference-Aware Multi-Cell Beamforming for an Overlapping Cells nvironment," Ieice Trans. Commun_, vol. E96-B, No_ 6, Jun. 2013, Xp-001584394, 10 pp.

\* cited by examiner

COORDINATED BEAMFORMING FOR OVERLAPPING BSS (OBSS) IN WIRELESS LAN (WLAN)—EXCHANGE OF IDENTITY INFORMATION

CROSS-REFERENCE TO RELATED APPLICATIONS

This application is a continuation of U.S. patent application Ser. No. 14/340,098, filed Jul. 24, 2014, and entitled "System and Methods for Enabling Coordinated Beamforming in Overlapping Basic Service Set in WLAN," which application is incorporated herein by reference.

TECHNICAL FIELD

The present invention relates to network communications, and, in particular embodiments, to a system and methods of enabling coordinated beamforming in overlapping basic service set in wireless local area network (WLAN).

BACKGROUND

Wireless Local Area Networks (WLANs) commonly operate in unlicensed spectrum bands. Rules for operation in these bands force competing devices to share the available resources and defer their intended transmissions when the medium is sensed busy. Typically, a WLAN uses an Orthogonal Frequency-Division Multiplexing (OFDM) transmission format in which all transmission resources are assigned to a single device. Random assignment is commonly achieved using carrier sense multiple access with collision avoidance (CSMA/CA). With CSMA/CA, a device wins access to the medium, transmits its data up to a pre-defined period of time, and then gives up the medium for other devices to compete for transmission. Coordinated beamforming is a mechanism that is used typically in cellular communication systems, by which a number of wireless devices in the interference range of each other are able to transmit their information to different destinations simultaneously. Simultaneous transmissions are made possible by using beamforming to eliminate or reduce the interference to acceptable levels. There is a need for a system and methods to efficiently implement beamforming in WLAN scenarios including overlapping basic service sets.

SUMMARY

In accordance with an embodiment, a method by an access point (AP) enabling coordinated beamforming for overlapping basic service sets (OBSSs) in wireless local area network (WLAN) includes deciding to participate in coordinated beamforming for OBSSs. The OBSSs comprise a plurality of APs and a plurality of stations (STAs) associated with the APs. The method further includes transmitting a coordinated beamforming (CB) announcement message indicating an identifier (ID) of the AP and an ID of each station (STA) associated with the AP.

In accordance with another embodiment, an AP enabling CB for OBSSs in WLAN comprises a processor and a non-transitory computer readable storage medium storing programming for execution by the processor. The programming includes instructions to decide to participate in coordinated beamforming for OBSSs. The OBSSs comprise a plurality of APs and a plurality of stations (STAs) associated with the APs. The programming includes further instructions to transmit a CB announcement message indicating an ID of the AP and an ID of each STA associated with the AP.

In accordance with another embodiment, a method by an AP enabling CB for OBSSs in WLAN includes receiving, at the AP, a CB announcement message from a second AP. The CB announcement message indicates an ID of the second AP and an ID of each STA associated with the second AP. The method further includes maintaining the ID of the second AP and the ID of each STA associated with the second AP in an entry of a CB table. The entry associates each STA with the second AP.

In accordance with yet another embodiment, an AP enabling CB for OBSSs in WLAN comprises a processor and a non-transitory computer readable storage medium storing programming for execution by the processor. The programming includes instructions to receive a CB announcement message from a second AP, wherein the CB announcement message indicates a media access control (MAC) address of the second AP and a MAC address of each STA associated with the second AP. The programming includes further instructions to maintain the MAC address of the second AP and the MAC address of each STA associated with the second AP in an entry of a CB table. The entry associates each STA with the second AP.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
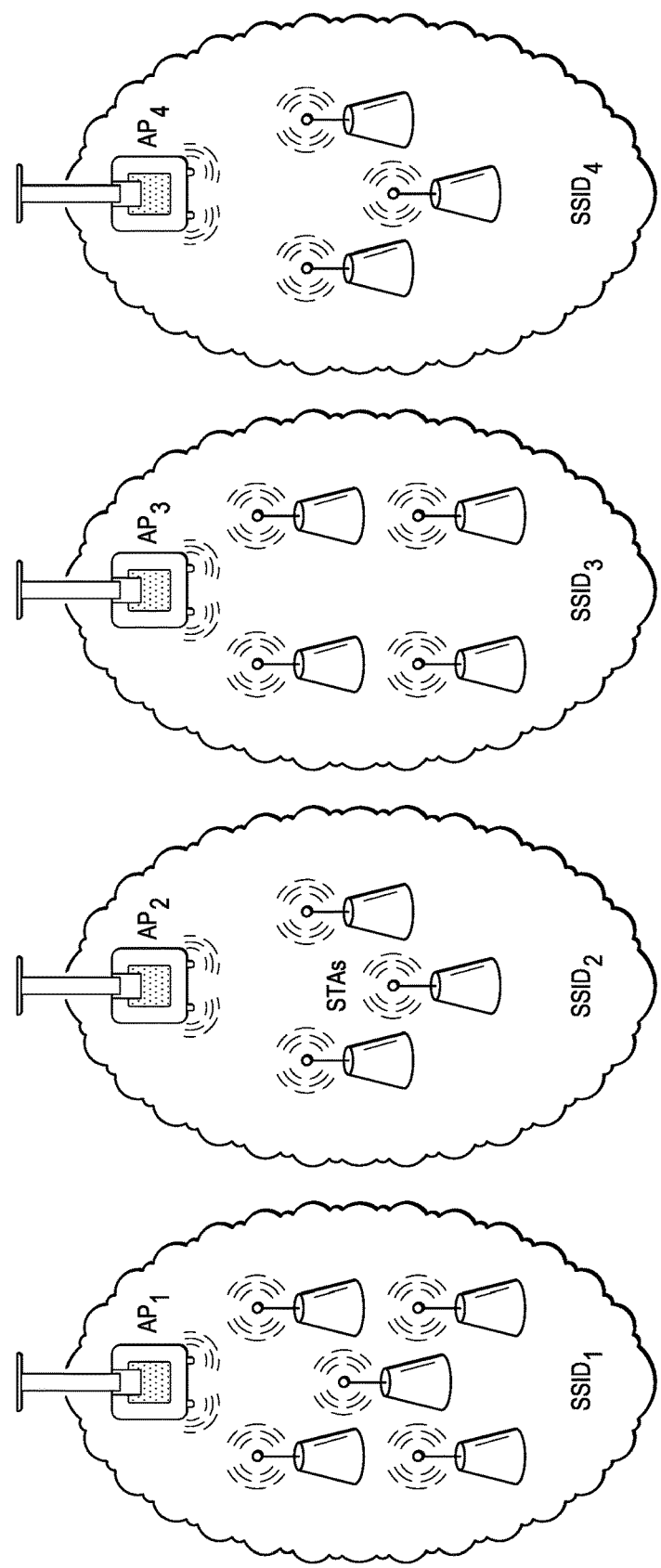
FIG. 1 is a diagram illustrating a scenario of overlapping basic service sets (OBSSs)

FIG. 1 shows an example of a plurality of basic service sets (BSSs) corresponding to a WLAN. Alternatively, the sets may correspond to multiple WLANs. The BSSs are identified by corresponding service set IDs (labeled SSID1 to SSID4 in the figure). Each BSS includes a corresponding access point (AP) and one or more stations (STAs) associated with the AP. The AP is any communication device, such as a wireless modem or router, allowing the STAs to access and communicate with the WLAN. The STAs are any user communication devices allowing users or subscribers to communicate with the AP and hence the WLAN. Examples of STAs include smartphones, tablet computers, laptop computers, desktop computers, sensor devices (e.g., smartwatch), and other mobile or communication devices with WLAN (e.g., WiFi) capability.

The BSSs may be relatively close to each other in a limited geographical area. For example, the BSSs may belong to different apartments in an apartment building, or they may belong to different establishments in a commercial district. Such sets are referred to herein as overlapping BSSs (OBSSs). Due to the proximity of the BSSs, the signals from the devices in different sets can experience significant interference which affects the quality of communications.

Disclosed herein are system and method embodiments for enabling a beamforming mechanism in WLAN scenarios to overcome the interference issue, such as in the case of multiple relatively close BSSs. Using beamforming, the communications in the different sets can be adjusted (e.g., via adjusting beam directions, orientation and parameters) to reduce the interference of the signals corresponding to different sets. The beamforming mechanism can be similar to the beamforming mechanism used in cellular communications systems. The embodiments address downlink coordinated beamforming where multiple WLAN APs are capable of simultaneous transmission to a subset of their associated STAs.

In a typical WLAN OBSS environment, a single device is allowed to transmit at any point in time using carrier sense multiple access (CSMA). As such, all other devices defer their transmissions to avoid interference. This behavior severely limits area throughput. Area throughput can be improved by using coordinated beamforming to eliminate or reduce the interference between devices and allowing multiple devices to simultaneously transmit at the same time.

The embodiments herein enable beamforming to allow the simultaneous transmission from a number of adjacent APs, where each AP can transmit to one or more of the STAs associated with it. This is referred to herein as downlink (DL) coordinated beamforming. As described above, in the case of OBSSs, each BSS is managed by a different entity, e.g., different AP or access controller (AC). Since the STAs associate with their corresponding APs independently from other sets, neighboring APs don't know which STA in another set is associated with which AP. However, beamforming requires the exchange of channel state information between all involved devices. To address this issue, the embodiments include a protocol for transferring this information to participating devices.

Figures 2, 3:
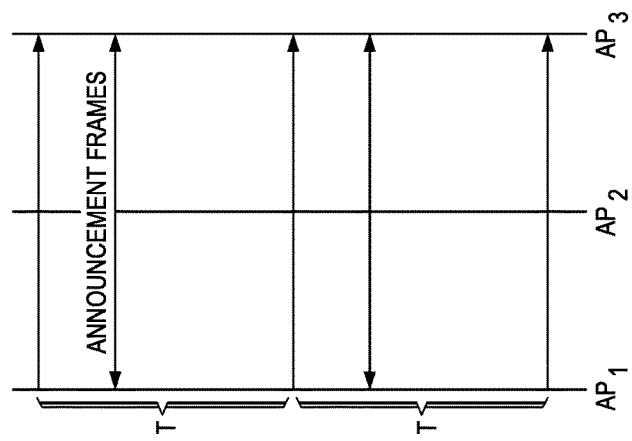
FIG. 2 is a diagram illustrating an embodiment of a coordinated beamforming announcement message.
FIG. 3 is a flow diagram illustrating an embodiment procedure for periodic transmission of an announcement message for coordinated beamforming.

In an embodiment, an AP that is ready and capable of supporting coordinated beamforming in the OBSS scenario exchanges relevant capability information with other neighboring APs. The AP announces its participation and its capabilities by broadcasting a message to all the neighboring APs. FIG. 2 shows an embodiment of a coordinated beamforming announcement message that is used for this purpose. For instance, the message can be based on a Public Action frame according to IEEE 802.11, and as such includes category and public fields. Additional fields are added to the message to announce the AP information. The announcement fields can include a capability field for the sending (announcing) AP and one or more fields indicating the Media Access Control (MAC) addresses of the STAs associated with the sending AP. The message can also include the sending AP's MAC address, e.g., in the AP capabilities field or another field of the message. The capabilities field indicates AP capability information such as the number of antennas, the number of spatial streams, and/or other capability information that are considered in the beamforming procedure. In other embodiments, identities of the announcing AP and associated STAs can be indicated by other suitable IDs or network addresses, such as Internet Protocol To implement the beamforming procedure, there is a need to acquire CSI information from all STAs in the participating OBSSs. The CSI information is needed in the computation process to configure the transmission beams at the participating APs for interference reduction. Providing each AP with the identities (MAC addresses) of the STAs associated with other APs, via the announcement message above, facilitates the exchange of the CSI information between that AP and the STAs associated with other APs. With this knowledge, an AP can identify each non-associated STA (in a different BSS) and request the CSI from that STA. In another embodiment, the APs monitor frames transmitted by all STAs in the different sets. The APs then extract, from the intercepted frames, the MAC addresses of the transmitting STAs and the MAC addresses of the associated APs.

Each participating AP can maintain the identities of the STAs and the associations between the STAs and their APs in a coordinated beamforming (CB) table. The table includes the identity of each participating AP and the identity of the STAs associated with it. The identities can be represented by the MAC addresses of the devices. The CB tables maintained by the participating APs need to be refreshed periodically to guarantee that the information is up to date. FIG. 3 shows an embodiment procedure for the periodic transmission of an announcement message for coordinated beamforming. In order to refresh the tables, each of the participating APs periodically sends the announcement message, for example every predefined time period, T. The value T can be set as some suitable multiple of the duration of the beacon frames. If a participating AP decides to end its participation in the CB transmission, then the AP stops its periodic transmission of the announcement message. If any AP among the participating APs stops the transmission of the announcement message, the entries associated with that AP are deleted from the CB tables at the other participating APs. For example, when a first AP stops receiving announcement messages from a second AP, the first AP deletes from its CB table the entries associated with that second AP.

Figure 4:
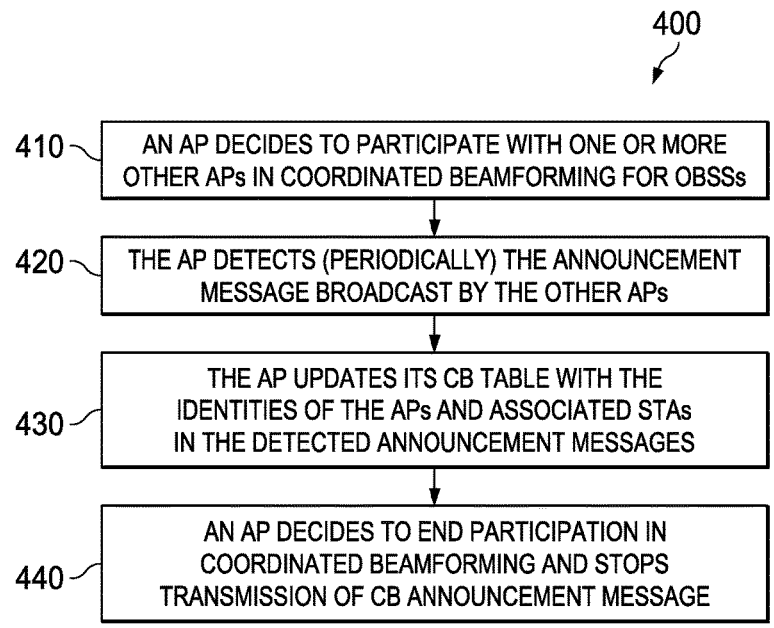
FIG. 4 illustrates an embodiment method for exchanging the identities of stations and APs in OBSSs.

FIG. 4 shows an embodiment method 400 for exchanging the identities of stations and APs in OBSSs. At step 405, an AP decides to participate with one or more other APs in coordinated beamforming for OBSSs. The OBSSs comprise the APs and a plurality of STAs associated with the APs. At step 410, each participating AP (belonging to a BSS) transmits (e.g., broadcasts) periodically an announcement message indicating its identity and the identities of all its associated STAs (in the same BSS). The identities may be the MAC addresses of the devices, the Internet Protocol (IP) addresses of the devices, other unique IDs of the devices, or combinations thereof. At step 420, the AP detects (periodically) the announcement message broadcast by the other APs. At step 430, the AP updates its CB table with the identities of the APs and associated STAs in the detected announcement messages. At step 440, an AP that decides to end participation in the coordinated beamforming stops transmission of the CB announcement message.

Figure 5:
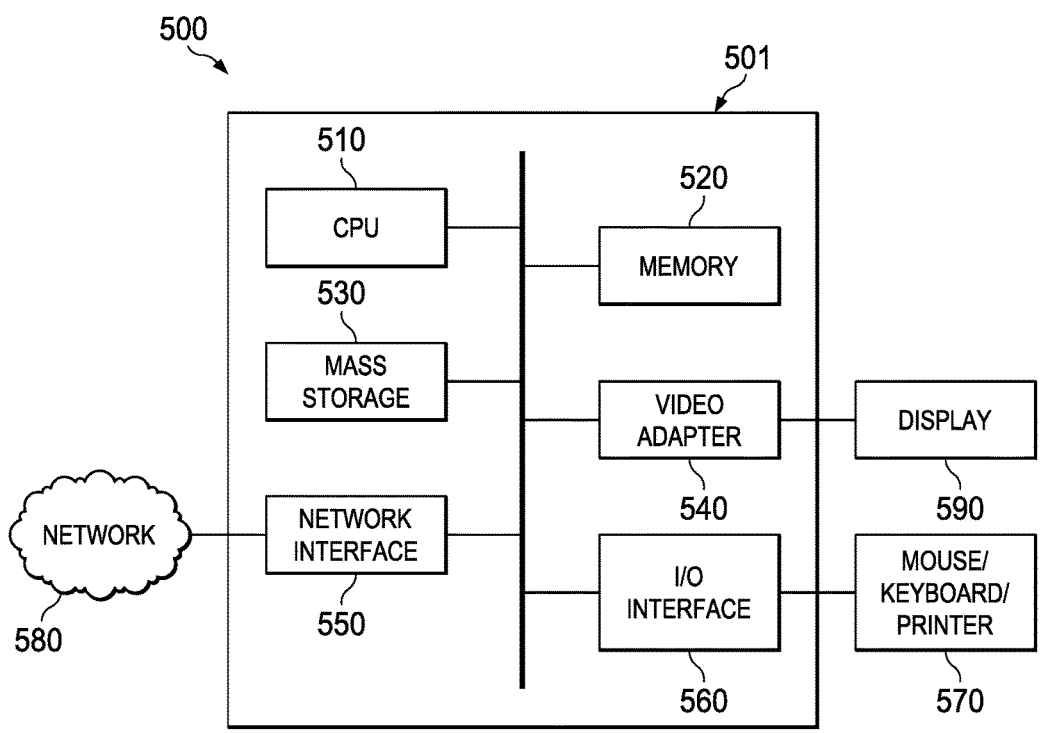
FIG. 5 is a diagram of a processing system that can be used to implement various embodiments.

FIG. 5 is a block diagram of a processing system 500 that can be used to implement various embodiments. For instance the processing system 500 can be part of an AP, a STA, or an access controller (AC) in a WLAN. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for a coordinated beamforming for overlapping basic service sets (OBSSs) in wireless local area network (WLAN), wherein the OBSSs comprise a plurality of access points (APs) and a plurality of stations (STAs) in a plurality of corresponding basic service sets (BSSs), the method comprising:

transmitting, by a first AP of the plurality of APs, to other APs of the plurality of APs a first coordinated beamforming (CB) announcement message, wherein the first CB announcement message includes an identifier (ID) of the first AP, IDs of STAs associated with the first AP, and beamforming capability information of the first AP, the first AP being in a first BSS of the plurality of the BSSs and the other APs being in other BSSs of the plurality of the BSSs; and receiving, by the first AP, a second CB announcement message from a second AP of the plurality of APs, wherein the second CB announcement message includes an ID of the second AP, IDs of STAs associated with the second AP, and beamforming capability information of the second AP, the second AP being in a second BSS of the plurality of the BSSs, wherein the first AP obtains channel state information of the STAs associated with the second AP based on the IDs of STAs associated with the second AP in the second CB announcement message.

2. The method of claim 1, further comprising adjusting, by the first AP, beamforming to the STAs associated with the first AP based on the received second CB announcement message.

3. The method of claim 2, wherein the adjusting comprises adjusting at least one of beam directions, orientation, and parameters.

4. The method of claim 2, wherein the second CB announcement message includes an ID of each station (STA) associated with the second AP, and the adjusting comprises:

acquiring, by the first AP, CSI information of each station (STA) associated with the second AP based on the ID of each STA in the second CB announcement message.

5. The method of claim 1, wherein transmitting to the other APs the CB announcement message comprises broadcasting the first CB announcement message.

6. The method of claim 1, wherein the ID of the first AP is a media access control (MAC) address of the first AP, and wherein the IDs of the STAs associated with the first AP are MAC addresses of the STAs associated with the first AP.

7. The method of claim 1, further comprising repeating transmission of the first CB announcement message periodically at a predefined period.

8. The method of claim 1, further comprising:
deciding to end participation in the coordinated beamforming; and
stopping transmitting the first CB announcement message.

9. The method of claim 1, further comprising maintaining an ID of the second AP and an ID of each second STA associated with the second AP in a CB table, wherein the CB table associates each second STA with the second AP.

10. The method of claim 9, further comprising:
stopping receiving the second CB announcement message; and
deleting the ID of the second AP and the ID of each second STA associated with the second AP from the CB table.

11. The method of claim 1, further comprising deleting an ID of a second STA associated with the second AP from a CB table after receiving the second CB announcement message from the second AP.

12. A first access point (AP) in overlapping basic service sets (OBSSs) in a wireless local area network (WLAN), wherein the OBSSs comprise a plurality of APs and a plurality of stations (STAs) in a plurality of corresponding basic service sets (BSSs), the first AP being in a first BSS of the plurality of the BSSs and comprising:
a processor; and
a non-transitory computer readable storage medium storing programming for execution by the processor, the programming including instructions to:
transmit to other APs of the plurality of APs a first coordinated beamforming (CB) announcement message, wherein the first CB announcement message includes an identifier (ID) of the first AP, IDs of STAs associated with the first AP, and beamforming capability information of the first AP, the other APs being in other BSSs of the plurality of the BSSs; and
receive a second CB announcement message from a second AP of the plurality of APs, wherein the second CB announcement message includes an ID of the second AP, IDs of STAs associated with the second AP, and beamforming capability information of the second AP, the second AP being in a second BSS of the plurality of the BSSs, wherein the first AP obtains channel state information of the STAs associated with the second AP based on the IDs of STAs associated with the second AP in the second CB announcement message.

13. The first AP of claim 12, further comprising the instruction to adjust beamforming to the STAs associated with the first AP based on the received second CB announcement message.

14. The first AP of claim 12, wherein the instruction to transmit to the other APs the CB announcement message comprises the instruction to broadcast the first CB announcement message.

15. The first AP of claim 12, wherein the ID of the first AP is a media access control (MAC) address of the first AP, and wherein the IDs of the STAs associated with the first AP are MAC addresses of the STAs associated with the first AP.

16. The first AP of claim 12, further comprising the instruction to repeat transmission of the first CB announcement message periodically at a predefined period.

17. The first AP of claim 12, further comprising:
the instruction to decide to end participation in a coordinated beamforming; and
the instruction to stop transmitting the first CB announcement message.

18. The first AP of claim 12, further comprising the instruction to maintaining an ID of the second AP and an ID of each second STA associated with the second AP in a CB table, wherein the CB table associates each second STA with the second AP.

19. The first AP of claim 18, further comprising:
the instruction to stop receiving the second CB announcement message; and
the instruction to delete the ID of the second AP and the ID of each second STA associated with the second AP from the CB table.

20. The first AP of claim 12, further comprising the instruction to deleting an ID of a second STA associated with the second AP from a CB table after receiving the second CB announcement message from the second AP.

* * * * *